United States Patent
Kudo (10) Patent No.: US 8,583,736 B2
(45) Date of Patent: Nov. 12, 2013

(54) COMMUNICATION DEVICE, COMPUTER PROGRAM PRODUCT, AND COMMUNICATION CONTROL METHOD FOR ESTABLISHING A COMMUNICATION PATH WITH ANOTHER COMMUNICATION DEVICE ALSO SEEKING TO ESTABLISH THE COMMUNICATION PATH

(75) Inventor: Yasuhiro Kudo, Ichinomiya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 179 days.

(21) Appl. No.: 13/191,856

(22) Filed: Jul. 27, 2011

(65) Prior Publication Data
US 2012/0030285 A1 Feb. 2, 2012

(30) Foreign Application Priority Data

Jul. 27, 2010 (JP) ................. 2010-167734

(51) Int. Cl.
*G06F 15/16* (2006.01)
*H04L 12/66* (2006.01)
*H04M 11/00* (2006.01)
*H04M 3/42* (2006.01)

(52) U.S. Cl.
USPC ........ 709/204; 709/229; 370/352; 379/93.01; 379/208.01; 379/215.01

(58) Field of Classification Search
USPC ................... 379/93.31, 208.01, 215.01, 219; 709/204, 229; 370/352, 389, 447, 232, 370/252; 455/411–417, 450, 522
See application file for complete search history.

(56) References Cited

U.S. PATENT DOCUMENTS

| | | | |
|---|---|---|---|
| 5,381,415 A * | 1/1995 | Mizutani | 370/447 |
| 2005/0083912 A1* | 4/2005 | Afshar et al. | 370/352 |
| 2005/0201357 A1* | 9/2005 | Poyhonen | 370/352 |
| 2007/0121831 A1* | 5/2007 | Kim et al. | 379/93.31 |
| 2008/0226053 A1* | 9/2008 | Takahashi | 379/208.01 |
| 2008/0279358 A1* | 11/2008 | Kim et al. | 379/208.01 |
| 2009/0225976 A1 | 9/2009 | Kudo | |

FOREIGN PATENT DOCUMENTS

JP 2009-212949 9/2009

* cited by examiner

*Primary Examiner* — Wing F Chan
*Assistant Examiner* — Raji Krishnan
(74) *Attorney, Agent, or Firm* — Banner & Witcoff, Ltd.

(57) ABSTRACT

A communication device is described in which a communication path is to be established with another communication device. The communication device transmits a first request packet to the other communication device and awaits a response. When a second request packet is received from the other communication device instead of a response to the first request packet, the communication device determines whether to transmit a positive response to the second request packet based on additional information included in the second request packet.

15 Claims, 8 Drawing Sheets

COMMUNICATION DEVICE, COMPUTER PROGRAM PRODUCT, AND COMMUNICATION CONTROL METHOD FOR ESTABLISHING A COMMUNICATION PATH WITH ANOTHER COMMUNICATION DEVICE ALSO SEEKING TO ESTABLISH THE COMMUNICATION PATH

CROSS-REFERENCE TO RELATED APPLICATION

This application claims priority to Japanese Patent Application No. 2010-167734, filed Jul. 27, 2010, the content of which is hereby incorporated herein by reference.

BACKGROUND

The present disclosure relates to a communication device, a computer program product, a communication control method. More specifically, the present disclosure relates to a communication device, a computer program product, and a communication control method in which a communication path is established by call control communication.

A communication device is known that performs call control communication via a call control device, such as a server, and establishes a communication path with a partner communication device, thereby starting peer to peer (P2P) communication with the partner communication device. In call control communication, a request packet requesting communication path establishment may be transmitted from a calling-side communication device (hereinafter referred to as a "calling device") to a partner communication device (hereinafter referred to as a "called device"). When the called device that has received the request packet permits communication path establishment with the calling device, the called device may transmit a positive response packet to the calling device. The calling device may receive the positive response packet. Thus, the communication path between the calling device and the called device may be established, and P2P communication may be started.

Before transmitting the request packet to the called device, the calling device may open a port that is used to perform P2P communication with the called device. The calling device may add a number (a port number) of the opened port to the request packet, and may transmit the request packet to the called device. The called device can use the port number added to the received request packet as a destination port number during P2P communication. In a case where the calling device cannot receive the positive response packet from the called device, the calling device may close the opened port. By immediately closing the unused port in this way, the calling device may inhibit the port from being used by an unspecified third party. Accordingly, it is possible to achieve improvement in security.

Request packets may be mutually transmitted by two communication devices around the same time. In this case, the communication device may be receive the request packet from the partner communication device before the communication device receives a positive response packet in response to the request packet transmitted by the communication device. For example, Request for Comments (RFC) 3261 defines a protocol to re-transmit a request packet to the called device after the respective communication devices wait for a random time period. A system is also known in which a communication device having a higher priority order of two communication devices re-transmits a request packet to the called device. Thus, even when request packets are transmitted from two communication devices around the same time, a communication path between the communication devices may be established.

SUMMARY

In a case where request packets are transmitted from two communication devices around the same time, the communication devices may not receive a positive response packet from the called device. Accordingly, in order to perform re-transmission processing of the request packet, opening/closing of the port may be frequently repeated in the communication device. In this type of case, a packet may not be forwarded accurately by a server or a router that is located on a communication path between the communication devices. The reason is as follows. The server or the router may open a port corresponding to the port opened in the communication device. The server or the router receives a packet from the communication device and forwards the received packet, using the opened port. Therefore, every time a new port is opened in the communication device, a corresponding port may be opened in the server or the router. In a case where the opening/closing of the port is frequently repeated in the communication device, the number of ports that is opened in the server or the router may increase. Accordingly, the number of available ports may be depleted in the server or the router. In this type of case, the server or the router may not newly open a port, and may not receive a packet from the communication device. The communication device may not perform highly reliable communication with the partner communication device. Further, a significant amount of ports may be opened in the server or the router, so security may be weakened.

Various embodiments of the broad principles derived herein provide a communication device, a computer program product, and a communication control method that are capable of performing communication with high reliability and high security with another communication device even when request packets are transmitted from two communication device.

Embodiments provide a communication device that includes an opening portion that opens a port that is to be used when peer to peer communication is performed with another communication device, and a first transmission portion that adds a port number of the port and additional information of the communication device to a first request packet and transmits the first request packet to the other communication device. The first request packet is a packet requesting establishment of a communication path with the other communication device. The communication device also includes a determination portion that, in a case where a response packet in response to the first request packet that has been transmitted by the first transmission portion is not received from the other communication device and a second request packet is received from the other communication device, determines whether to transmit a positive response packet to the other communication device, based on additional information added to the second request packet, the second request packet being a packet requesting establishment of a communication path with the communication device, and a second transmission portion that transmits the positive response packet to the other communication device in a case where the determination portion determines that the positive response packet is to be transmitted.

Embodiments also provide a computer program product stored on a non-transitory computer-readable medium. The computer program product includes instructions for causing a computer of a communication device to execute the steps of opening a port that is to be used when peer to peer communication is performed with another communication device, transmitting, to the other communication device, a first request packet to which a port number of the port and additional information of the communication device are added, the first request packet being a packet requesting establishment of a communication path with the other communication device, determining, in a case where a response packet in response to the first request packet that has been transmitted is not received from the other communication device and a second request packet is received from the other communication device, whether to transmit a positive response packet to the other communication device, based on additional information added to the second request packet, the second request packet being a packet requesting establishment of a communication path with the communication device, and transmitting the positive response packet to the other communication device in a case where it is determined that the positive response packet is to be transmitted.

Embodiments further provide a method of controlling a communication device. The method includes the steps of opening a port that is to be used when peer to peer communication is performed with another communication device, transmitting, to the other communication device, a first request packet to which a port number of the port and additional information of the communication device are added, the first request packet being a packet requesting establishment of a communication path with the other communication device, determining, in a case where a response packet in response to the first request packet that has been transmitted is not received from the other communication device and a second request packet is received from the other communication device, whether to transmit a positive response packet to the other communication device, based on additional information added to the second request packet, the second request packet being a packet requesting establishment of a communication path with the communication device, and transmitting the positive response packet to the other communication device in a case where it is determined that the positive response packet is to be transmitted.

BRIEF DESCRIPTION OF THE DRAWINGS

Embodiments will be described below in detail with reference to the accompanying drawings in which.

DETAILED DESCRIPTION

Hereinafter, an embodiment of the present invention will be described with reference to the drawings.

Figure 1:
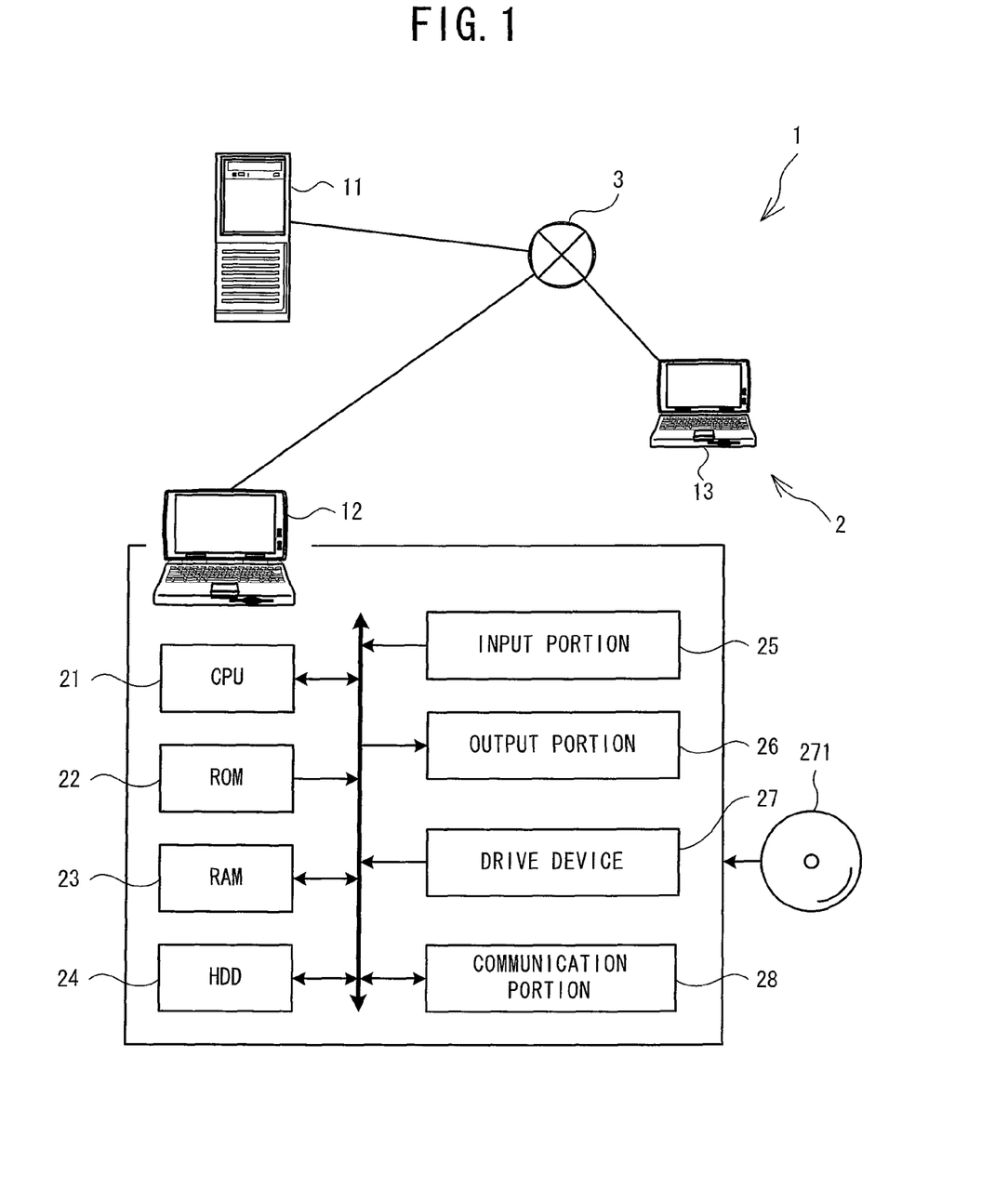
FIG. 1 is a diagram showing an overview of a communication system and an electrical configuration of a communication device.

A communication system 1 will be described with reference to FIG. 1. The communication system 1 includes a server 11 and communication devices 12 and 13. Hereinafter, when the communication devices 12 and 13 are not distinguished, the communication devices 12 and 13 are referred to as "communication device(s) 2". The server 11 and the communication devices 2 can perform mutual communication via a network 3. Each of the communication devices 2 can establish a communication path using call control communication, and can start P2P communication. The communication device 2 is, for example, a known personal computer. Session initiation protocol (SIP), for example, is used as a protocol for call control communication. The server 11 controls the call control communication between the communication devices 2. The server 11 is a SIP server. Reference numerals (12 and 13) assigned to the communication devices 2 also indicate an ID of each of the communication devices 2.

An electrical configuration of the communication device 12 will be described. An electrical configuration of the communication device 13 is the same as that of the communication device 12. The communication device 12 includes a CPU 21 that controls the communication device 12. The CPU 21 is electrically connected to a ROM 22, a RAM 23, a hard disk drive (HDD) 24, an input portion 25, an output portion 26, a drive device 27, and a communication portion 28. ROM 22 stores a boot program, a basic input output system (BIOS), an operation system (OS), and the like. RAM 23 stores temporary data, such as a timer value and a counter value. HDD 24 stores a control program for the CPU 21. The input portion 25 may be a keyboard or a mouse, which is used for receiving input from a user. The output portion 26 may be a display, which displays an image. The drive device 27 can read out information stored in a storage medium 271. For example, when the communication device 12 is set up, a control program stored in the storage medium 271 may be read out by the drive device 27, and may be stored in the HDD 24. The communication portion 28 performs timing control when communication is performed with the other communication device 2 via the network 3.

Figure 2:
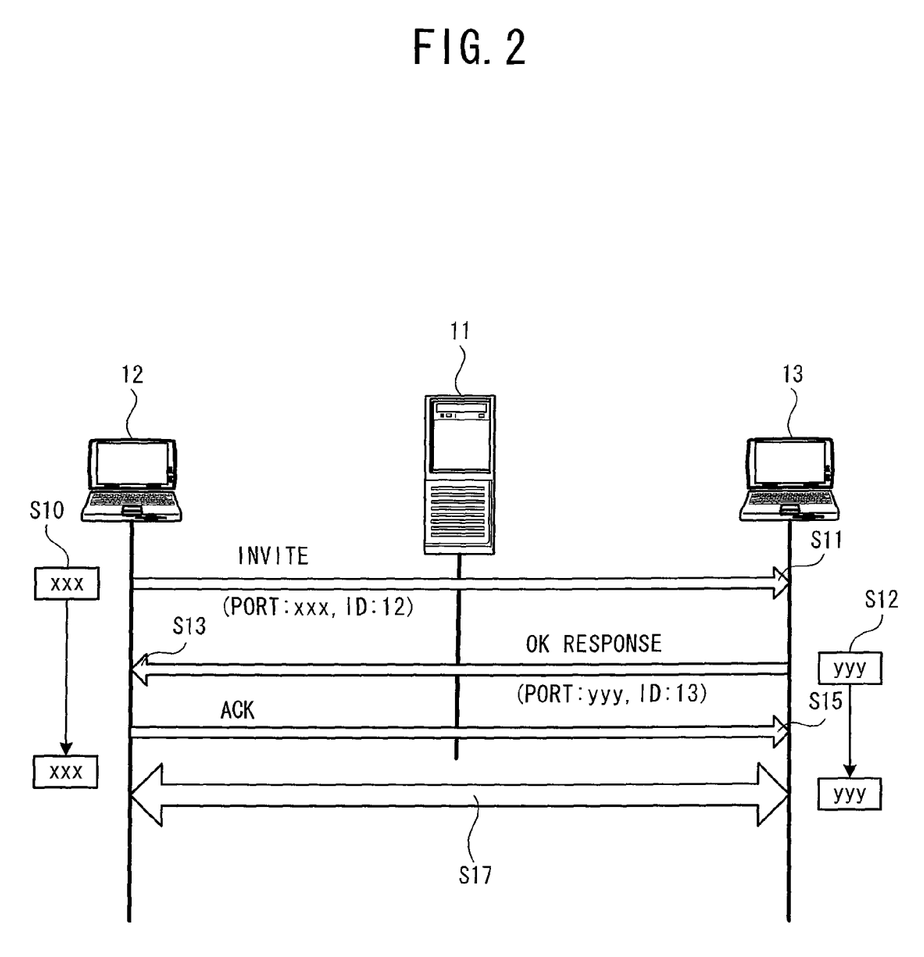
FIG. 2 is a diagram showing a communication sequence between two communication devices.
Figure 3:
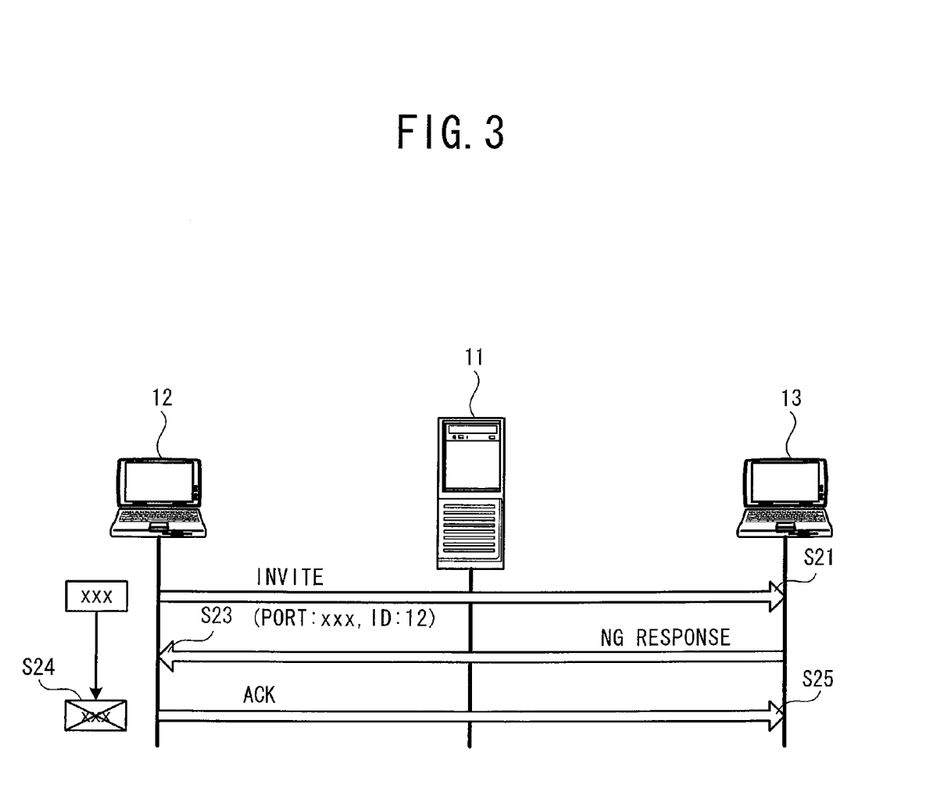
FIG. 3 is a diagram showing a communication sequence between the two communication devices.

An overview of call control communication performed between the communication devices 12 and 13 will be described using three examples, with reference to FIGS. 2 to 4. First, a first example will be described with reference to FIG. 2. It is assumed that a user of the communication device 12 inputs, via the input portion 25, a command to start P2P communication with the communication device 13. As shown in FIG. 2, the communication device 12 opens a port (port number: xxx) that is used during P2P communication with the communication device 13 (step S10). The phrase "a port is opened" indicates that a port number of a port that is to be used when receiving a packet transmitted from a partner communication device is selected and acquired from among a plurality of available port numbers. Hereinafter, the partner communication device 2 is referred to as the "partner device". When a packet addressed to the port number of the opened port is transmitted from the communication device 13, the communication device 12 can receive the transmitted packet.

The communication device 12 generates a request packet (INVITE) that requests the communication device 13 to establish a communication path. The port number (xxx) of the opened port and the ID (12) of the communication device 12 are added to the generated request packet (INVITE). The communication device 12 transmits to the server 11 the request packet (INVITE) addressed to the communication device 13. The server 11 receives the request packet (INVITE) transmitted from the communication device 12, and forwards the received request packet to the communication device 13. The communication device 13 receives the request packet (INVITE) forwarded by the server 11 (step S11). The communication device 13 extracts the port number added to the received request packet (INVITE) and stores the extracted port number in the RAM 23.

It is assumed that a user of the communication device 13 inputs, via the input portion 25, a command to permit P2P communication with the communication device 12. The communication device 13 opens a port (port number: yyy) that is used during P2P communication with the communication device 12 (step S12). The communication device 13 generates a positive response packet (OK response) for the communication device 12. The positive response packet (OK response) is a packet to notify permission of communication path establishment. The port number (yyy) of the opened port and the ID (13) of the communication device 13 are added to the generated positive response packet (OK response). The communication device 13 transmits to the server 11 the positive response packet (OK response) addressed to the communication device 12. The server 11 receives the positive response packet (OK response) transmitted from the communication device 13, and forwards the received positive response packet to the communication device 12. The communication device 12 receives the positive response packet (OK response) forwarded by the server 11 (step S13). The communication device 12 extracts the port number added to the received positive response packet (OK response) and stores the extracted port number in the RAM 23. The communication device 12 transmits an ACK packet that notifies reception of the positive response packet (OK response) to the communication device 13 via the server 11. The communication device 13 receives the ACK packet via the server 11 (step S15).

Through the above-described call control communication, the communication path between the communication devices 12 and 13 is established. The communication device 12 reads out the port number (yyy) added to the positive response packet (OK response) from the RAM 23 and uses the port number (yyy). The communication device 13 reads out the port number (xxx) added to the request packet (INVITE) from the RAM 23 and uses the port number (xxx). Thus, the communication devices 12 and 13 may directly perform P2P communication (step S17).

A second example will be described with reference to FIG. 3. When the user of the communication device 12 inputs a command to start P2P communication with the communication device 13, a request packet (INVITE) is transmitted from the communication device 12 to the communication device 13 via the server 11, as shown in FIG. 3 (step S21). It is assumed that the user inputs, to the communication device 13 that has received the request packet (INVITE), a command to reject P2P communication with the communication device 12. The communication device 13 generates a negative response packet (NG response) for the communication device 12. The negative response packet (NG response) is a packet to notify rejection of communication path establishment. The generated negative response packet (NG response) is transmitted to the communication device 12 via the server 11. The communication device 12 receives the negative response packet (NG response) (step S23). In this case, the packet returned from the communication device 13 in response to the request packet (INVITE) transmitted by the communication device 12 is not the positive response packet (OK response). Accordingly, the communication device 12 closes the port (port number: xxx) that was opened when the request packet (INVITE) was transmitted (step S24). The phrase "the port is closed" indicates that the acquired port number is released so that reception of a packet addressed to this port number is disabled.

The communication device 12 transmits an ACK packet that notifies reception of the negative response packet (NG response) to the communication device 13 via the server 11. The communication device 13 receives the ACK packet via the server 11 (step S25). The communication path between the communication devices 12 and 13 is not established. Accordingly, P2P communication between the communication devices 12 and 13 is not performed.

As described above, in a case where the packet that is received from the communication device 13 by the communication device 12 after the communication device 12 has transmitted the request packet (INVITE) is a negative response packet (NG response), the communication device 12 closes the opened port. Thus, the communication device 12 may inhibit the opened port from being used by an unspecified third party, and thereby may improve security.

Figure 4:
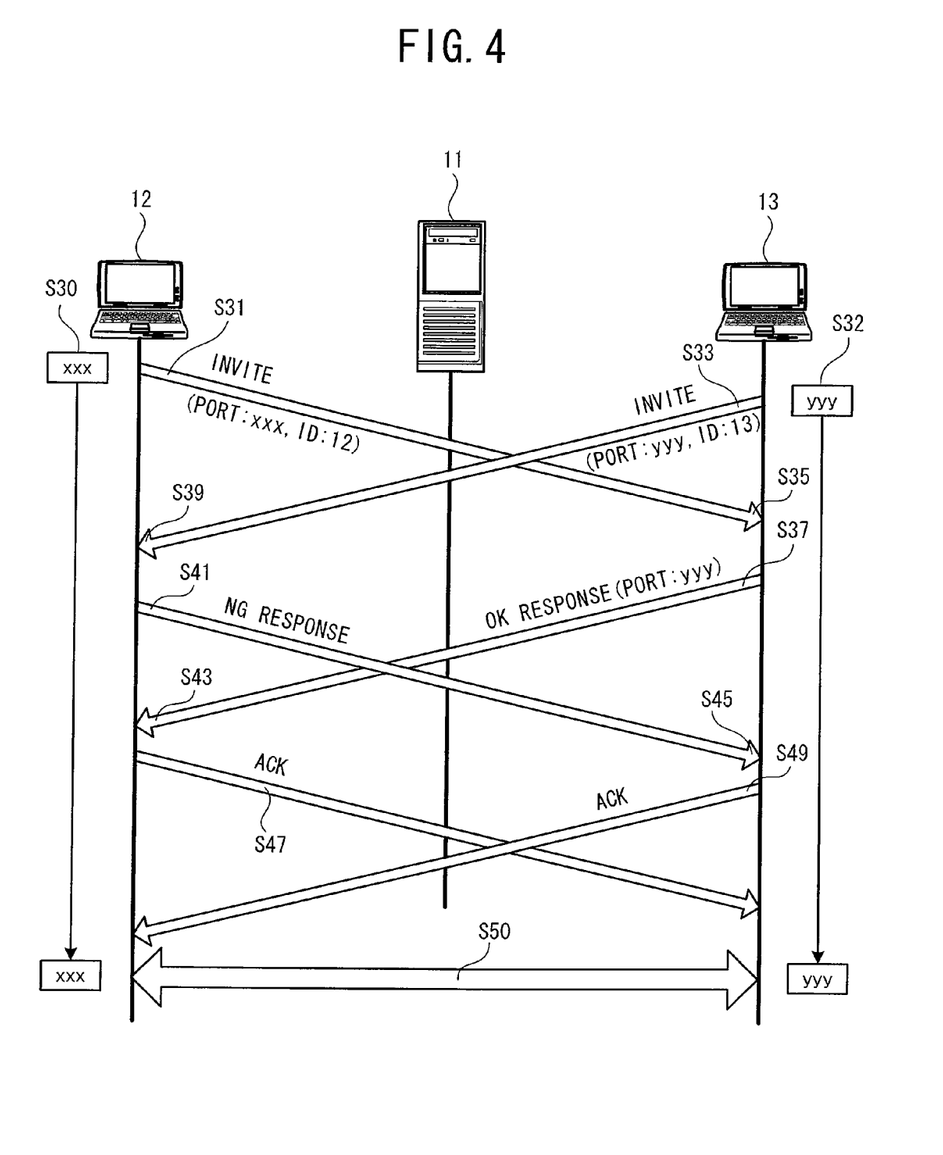
FIG. 4 is a diagram showing a communication sequence between the two communication devices.

With reference to FIG. 4, a third example will be described. In the third example, a command to start P2P communication with the communication device 13 is input to the communication device 12, and around the same time, a command to start P2P communication with the communication device 12 is input to the communication device 13.

In a case where the command to start P2P communication with the communication device 13 is input to the communication device 12, the communication device 12 opens a port (port number: xxx) (step S30). The communication device 12 transmits, to the communication device 13 via the server 11, a request packet (INVITE) to which the port number (xxx) and the ID (12) are added (step S31). In a case where the command to start P2P communication with the communication device 12 is input to the communication device 13 around the same time, the communication device 13 opens a port (port number: yyy) (step S32). The communication device 13 transmits, to the communication device 12 via the server 11 (step S33), a request packet (INVITE) to which the port number (yyy) and the ID (13) are added.

The communication device 13 receives the request packet (INVITE) transmitted from the communication device 12, via the server 11 (step S35). The packet that is received from the communication device 12 by the communication device 13 after the communication device 13 has transmitted the request packet (INVITE) is not a positive response packet (OK response). In a case where the packet received from the communication device 12 is not a positive response packet (OK response) but a request packet (INVITE), the communication device 13 determines that a command to start P2P communication with the communication device 13 has been input to the communication device 12. In order to continuously perform call control communication, the communication device 13 does not close the port opened in the processing at step S32 and secures the opened port as it is. Thus, the communication device 13 may inhibit opening/closing of the port from occurring frequently. The communication device 13 stores the port number added to the received request packet (INVITE) in the RAM 23.

In a similar manner, the communication device 12 receives the request packet (INVITE) transmitted from the communication device 13, via the server 11 (step S39). Since the received packet is not a positive response packet (OK response) but the request packet (INVITE), the communication device 12 determines that a command to start P2P communication with the communication device 12 has been input to the communication device 13. The communication device 12 does not close the port opened in the processing at step S30 and secures the opened port as it is. Thus, the communication device 12 may inhibit opening/closing of the port from occurring frequently.

Next, the communication devices 12 and 13 determine the type of the packet to be returned in response to the received request packet (INVITE). Normally, in a case where a packet other than the positive response packet is received after the request packet (INVITE) has been transmitted, the communication devices 12 and 13 return a negative response packet (NG response). However, as described above, in a case where it is determined that a command to start P2P communication has been input to the partner device around the same time, either one of the communication devices 12 and 13 transmits a positive response packet (OK response) to the partner device.

A determination whether or not to transmit the positive response packet (OK response) is made by comparing the ID added to the received request packet (INVITE) with the ID of the communication device that has received the request packet. A specific method is as follows. The ID of the communication device 13 is larger than the ID (12) added to the received request packet (INVITE). In this case, the communication device 13 returns a positive response packet (OK response) to the communication device 12 (step S37). The port number (yyy) of the port opened in the processing at step S32 is added to the positive response packet (OK response). On the other hand, the ID of the communication device 12 is smaller than the ID (13) added to the received request packet (INVITE). In this case, the communication device 12 transmits a negative response packet (NG response) to the communication device 13 as per normal (step S41).

The communication device 12 receives the positive response packet (OK response) transmitted from the communication device 13, via the server 11 (step S43). After transmitting the negative response packet (NG response) in the processing at step S41, the communication device 12 may receive the positive response packet (OK response). In this case, the communication device 12 determines that the request packet (INVITE) transmitted by the communication device 12 in the processing at step S31 has been normally processed in the communication device 13. Thus, the communication device 12 can determine that the communication path with the communication device 13 has been successfully established. The port number added to the received positive response packet (OK response) is stored in the RAM 23. The communication device 12 returns an ACK packet to the communication device 13 (step S47).

The communication device 13 receives the negative response packet (NG response) transmitted from the communication device 12, via the server 11 (step S45). After transmitting a positive response packet (OK response) to the communication device 12, the communication device 13 may receive the negative response packet (NG response) from the communication device 12. In this case, the communication device 13 can determine that the communication path with the communication device 12 has been successfully established. The communication device 13 returns an ACK packet to the communication device 12 (step S49). The communication devices 12 and 13 respectively receive the ACK packets via the server 11.

The communication device 12 reads out, from the RAM 23, the port number (yyy) added to the positive response packet (OK response) received in the processing at step S43, and uses the port number (yyy). The communication device 13 reads out, from the RAM 23, the port number (xxx) added to the request packet (INVITE) received in the processing at step S35, and uses the port number (xxx). Thus, the communication devices 12 and 13 may directly perform P2P communication (step S50).

As described above, even in a case where the packet that is received from the partner device after the communication device 2 has transmitted the request packet (INVITE) is not the positive response packet (OK response), if the received packet is the request packet (INVITE), the communication device 2 does not close the opened port and continues call control communication. Thus, even in a case where the communication device and the partner device transmit the request packet (INVITE) to each other substantially the same time, it is possible to inhibit opening/closing of the port from occurring frequently in the communication device 2. In a case where opening/closing of the port frequently occurs in a communication device, a packet may not be forwarded accurately by a relay device (a server, a router or the like) located on a communication path between communication devices. In contrast to this, in the communication device 2, the port number, once opened, may be continuously used, and it is therefore possible to perform highly reliable P2P communication between the communication devices 2. The number of the opened ports can be reduced to a minimum, and it is therefore possible to maintain favorable communication security.

The port number (yyy) may not be added to the positive response packet (OK response) transmitted to the communication device 12 by the communication device 13. The communication device 12 may perform P2P communication with the communication device 13 by using the port number (yyy) added to the request packet (INVITE) received from the communication device 13.

The transmission timing may be changed of the response packet (the positive response packet (OK response) or the negative response packet (NG response)) transmitted from the communication device 2 after the ID comparison. Specifically, for example, a time period from the ID comparison to the transmission of the negative response packet (NG response) may be longer than a time period from the ID comparison to the transmission of the positive response packet (OK response). Alternatively, the transmission timing of the negative response packet (NG response) may be after the positive response packet (OK response) has been received from the partner device. In these cases, it is possible to inhibit a situation in which the positive response packet (OK response) and the negative response packet (NG response) transmitted from the respective communication devices 2 collide on the communication path and call control communication fails.

In a case where the communication device 2 receives a request packet (INVITE) from the partner device after transmitting a request packet (INVITE), the communication device 2 may transmit a positive response packet (OK response) to the partner device without performing the ID comparison processing.

As described above, in a case where the communication device 2 receives the request packet (INVITE) from the partner device after transmitting the request packet (INVITE), the ID comparison processing may be performed when a command to permit communication path establishment is input. Irrespective of whether the command has been input, the ID comparison processing may be constantly performed and the type of the response packet to be returned may be determined.

For example, communication may be performed in the following manner. Before the communication device 13 receives the response packet from the communication device 12 after transmitting the request packet (INVITE), if the communication device 13 receives the request packet (INVITE) from the communication device 12, the communication device 13 may compare the ID added to the received request packet (INVITE) with the ID of the communication device 13. In this case, the ID of the communication device 13 is larger than the ID added to the received request packet (INVITE), and therefore, the communication device 13 may re-transmit a request packet (INVITE) to the communication device 12. Before the communication device 12 receives the response packet from the communication device 13 after transmitting the request packet (INVITE), if the communication device 12 receives the request packet (INVITE) from the communication device 13, the ID of the communication device 12 is smaller than the ID added to the received request packet (INVITE), and therefore, the communication device 12 may not return a packet to the communication device 13 and may be in a stand-by state without performing any processing. The communication device 12 may receive the request packet (INVITE) re-transmitted from the communication device 13, and may transmit a positive response packet (OK response) to the communication device 13. With the above method, the communication path between the communication devices 12 and 13 may be established. Accordingly, it is possible to start P2P communication between the communication devices 12 and 13.

Main processing that is performed by the CPU 21 of the communication device 2 will be described with reference to FIGS. 5 to 8. When a power source of the communication device 2 is turned on, the CPU 21 performs the main processing by activating and executing the control program stored in the HDD 24.

Figure 5:
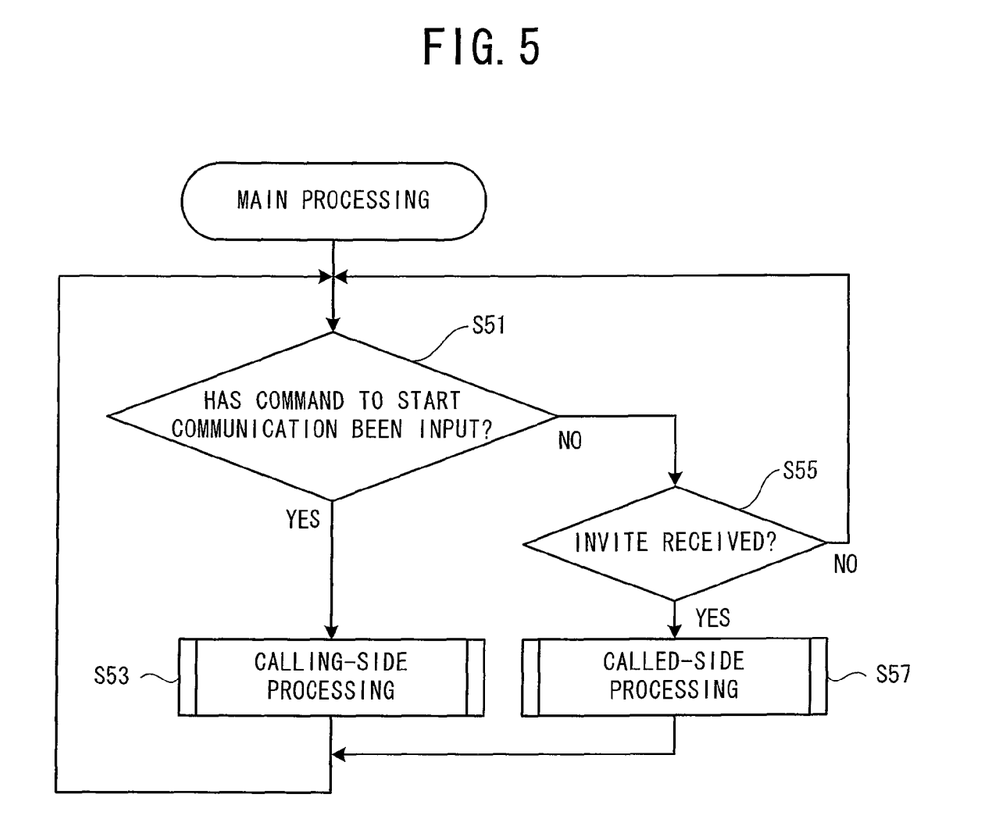
FIG. 5 is a flowchart showing main processing.

As shown in FIG. 5, in the communication device 2, it is determined whether a command to start P2P communication with the partner device has been input via the input portion 25 (step S51). If the command to start P2P communication with the partner device has been input (YES at step S51), calling-side processing (refer to FIGS. 6 and 7) is performed (step S53). The calling-side processing is processing that starts call control communication when the communication device 2 transmits a request packet (INVITE). After the calling-side processing has been terminated, the processing returns to step S51. If the command to start P2P communication with the partner device has not been input (NO at step S51), it is determined whether the request packet (INVITE) transmitted from the partner device has been received (step S55). If the request packet (INVITE) has been received (YES at step S55), the port number added to the received request packet (INVITE) is extracted and stored in the RAM 23. Then, called-side processing (refer to FIG. 8) is performed (step S57). The called-side processing is processing that starts call control communication with the partner device that has transmitted the request packet (INVITE). After the called-side processing has been terminated, the processing returns to step S51. If the request packet (INVITE) has not been received (NO at step S55), the processing returns to step S51.

The calling-side processing will be described with reference to FIG. 6. A port that is used to perform P2P communication with the partner device is opened (step S61). The ID of the communication device 2 is read out from the ROM 22 and acquired (step S62). A request packet (INVITE) to which the port number of the opened port and the acquired ID of the communication device 2 are added is generated. The generated request packet (INVITE) is transmitted to the partner device via the server 11 (step S63).

It is determined whether the request packet (INVITE) transmitted from the partner device has been received via the server 11 (step S65). If the request packet (INVITE) has been received (YES at step S65), it is determined that a calling command has been input to the partner device. The port number added to the received request packet (INVITE) is extracted and stored in the RAM 23. It is determined whether an ID is added to the received request packet (INVITE) (step S67). If the ID is not added to the request packet (INVITE) (NO at step S67), it is not possible to perform the comparison processing to compare the ID of the communication device 2 with the ID of the partner device. Accordingly, a negative response packet (NG response) is transmitted to the partner device via the server 11 (step S75). Thus, the establishment of an unexpected communication path may be inhibited. The processing returns to step S65.

If the ID is added to the request packet (INVITE) transmitted from the partner device (YES at step S67), the added ID is compared with the ID of the communication device 2 (step S69). If the ID of the communication device 2 is not larger than the ID added to the request packet (INVITE) (NO at step S69), a negative response packet (NG response) is transmitted to the partner device via the server 11 (step S75). Thus, permission to establish the communication path may be notified to the partner device. The processing returns to step S65.

If the ID of the communication device 2 is larger than the ID added to the request packet (INVITE) (YES at step S69), a positive response packet (OK response) to which the port number of the port opened at step S61 is added is generated (step S71). The generated positive response packet (OK response) is transmitted to the partner device via the server 11 (step S73). The processing proceeds to step S91 (refer to FIG. 7).

Figure 6:
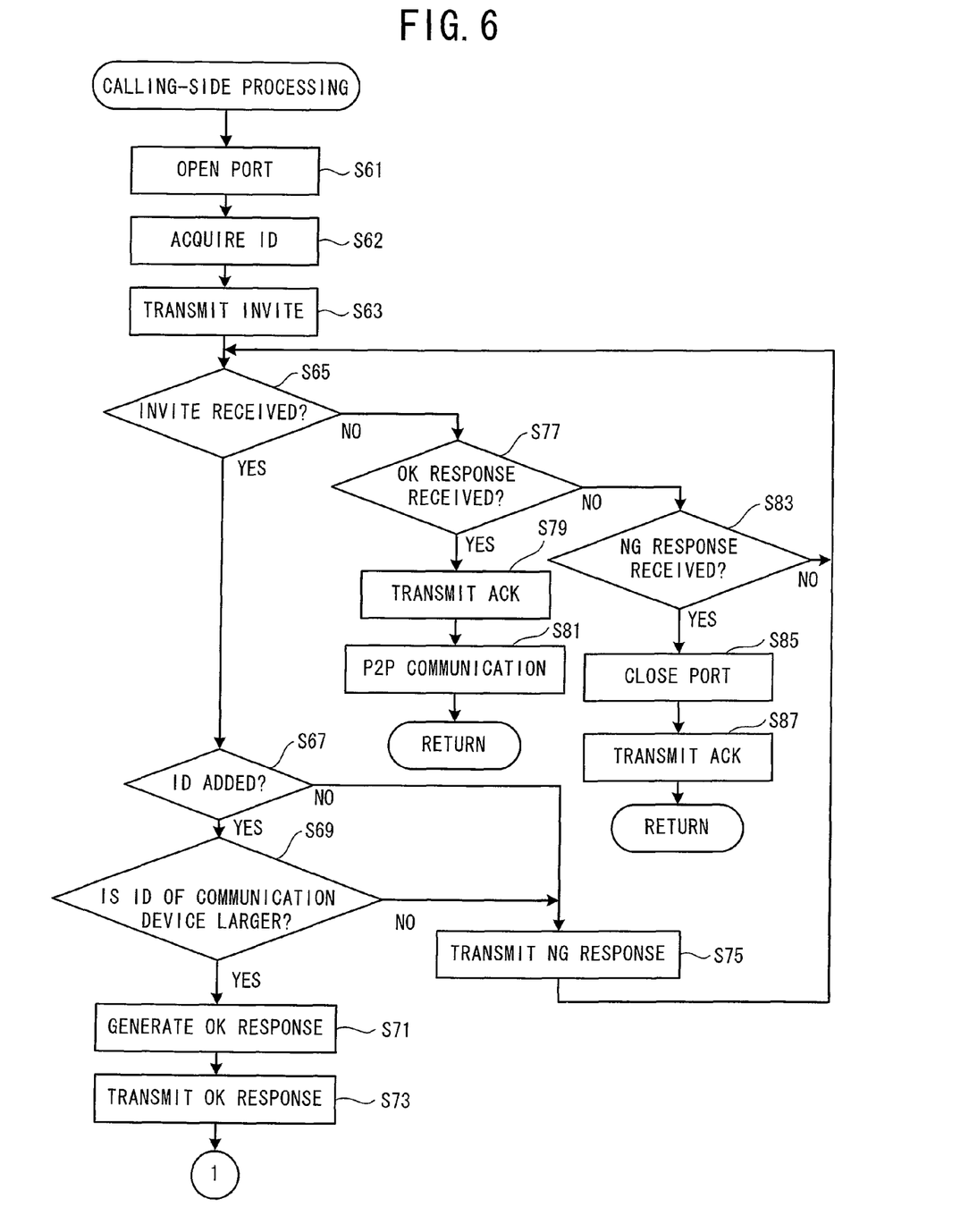
FIG. 6 is a part of a flowchart showing calling-side processing.
Figure 7:
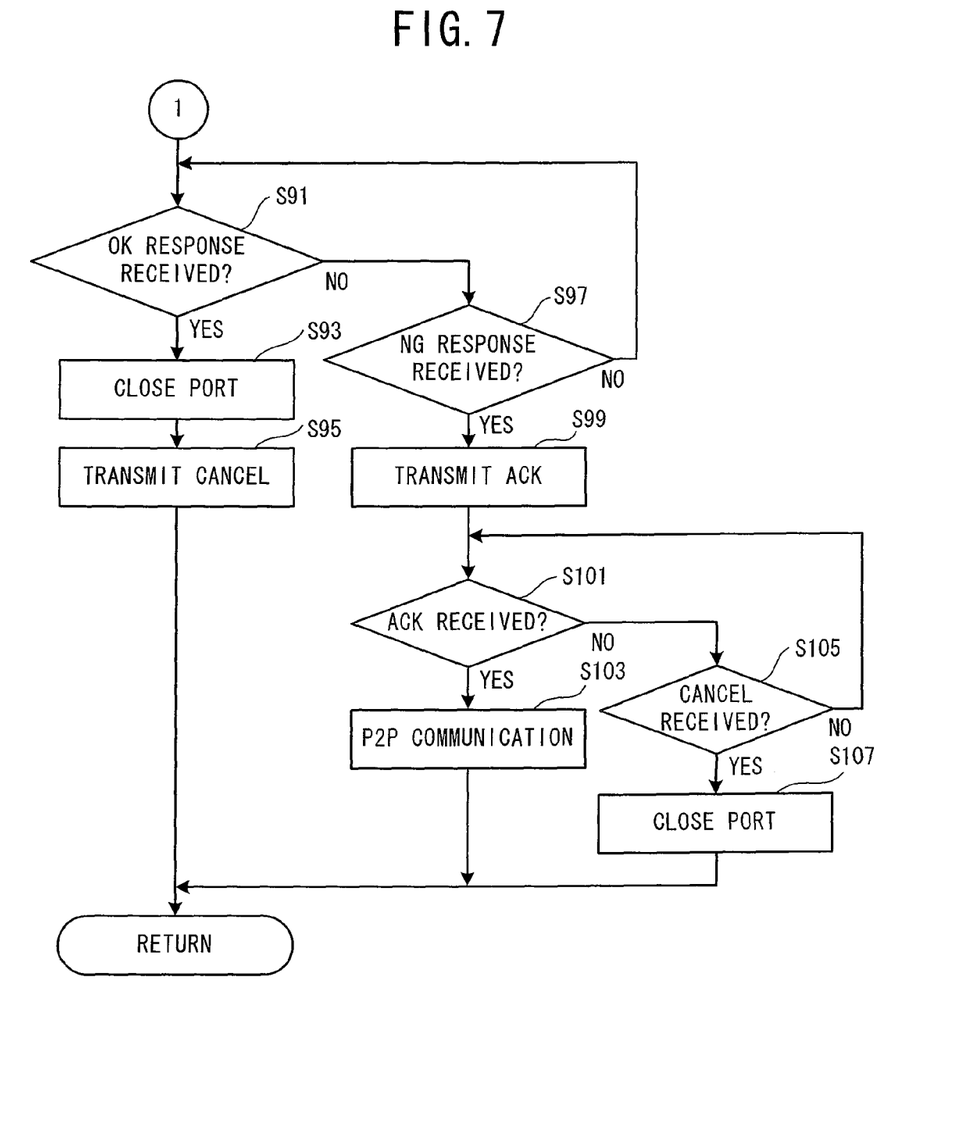
FIG. 7 is another part of the flowchart showing the calling-side processing.

As shown in FIG. 7, after the positive response packet (OK response) has been transmitted, reception of a response packet to be returned from the partner device is monitored. If a positive response packet (OK response) returned from the partner device is received via the server 11 (YES at step S91), normal processing may not be performed in the partner device. This is because the ID of the communication device 2 is larger than the ID of the partner device and therefore, the partner device that has received the request packet (INVITE) transmitted by the communication device 2 normally returns a negative response packet (NG response). In this case, the port opened at step S61 (refer to FIG. 6) is closed (step S93). A CANCEL packet notifying termination of call control communication that is being performed is transmitted to the partner device via the server 11 (step S95). Thus, in a case where the communication device 2 determines that communication path establishment with the partner device has failed, the communication device 2 closes the opened port number. It is therefore possible to inhibit the opened port from being used by an unspecified third party. The calling-side processing is terminated, and the processing returns to the main processing (refer to FIG. 5).

If the communication device 2 receives not a positive response packet (OK response) but a negative response packet (NG response) from the partner device via the server 11 (NO at step S91 and YES at step S97), the request packet (INVITE) transmitted by the communication device 2 in the processing at step S63 (refer to FIG. 6) may have been processed normally in the partner device. In this case, an ACK packet notifying reception of the negative response packet (NG response) is returned to the partner device (step S99). It is determined whether the ACK packet transmitted from the partner device has been received via the server 11 (step S101). In response to the positive response packet (OK response) transmitted by the communication device 2 to the partner device in the processing at step S73 (refer to FIG. 6), reception of the ACK packet to be transmitted from the partner device is monitored.

If the ACK packet has been received (YES at step S101), the positive response packet (OK response) transmitted by the communication device 2 in the processing at step S73 may have been processed normally in the partner device. Accordingly, the communication path with the partner device may be established. The port number added to the request packet (INVITE) received in the processing at step S65 (refer to FIG. 6) is read out from the RAM 23. The read out port number is used to perform P2P communication with the partner device (step S103). Thus, in a case where the communication device 2 receives the negative response packet (NG response) from the partner device after transmitting the positive response packet (OK response) to the partner device, the communication device 2 can determine that the communication path with the partner device has been successfully established. The communication device 2 may use the port opened in the processing at step S61 (refer to FIG. 6). Accordingly, the communication device 2 can easily perform P2P communication with the partner device. The calling-side processing is terminated and the processing returns to the main processing (refer to FIG. 5).

If the ACK packet has not been received (NO at step S101), it is determined whether the CANCEL packet transmitted from the partner device has been received via the server 11 (step S105). If the CANCEL packet has not been received (NO at step S105), the processing returns to step S101. If the CANCEL packet has been received (YES at step S105), the positive response packet (OK response) transmitted by the communication device 2 in the processing at step S73 (refer to FIG. 6) may have not been processed normally in the partner device. The port opened in the processing at step S61 (refer to FIG. 6) is closed (step S107). The calling-side processing is terminated and the processing returns to the main processing (refer to FIG. 5).

As shown in FIG. 6, if the request packet (INVITE) has not been received (NO at step S65), it is determined whether the positive response packet (OK response) transmitted from the partner device has been received via the server 11 (step S77). If the positive response packet (OK response) has been received (YES at step S77), it means that the partner device has permitted communication path establishment in response to the request packet (INVITE) transmitted by the communication device 2. The port number added to the positive response packet (OK response) is extracted and stored in the RAM 23. An ACK packet notifying reception of the positive response packet (OK response) is transmitted to the partner device via the server 11 (step S79). Thus, the communication path with the partner device may be established. The port number stored in the RAM 23 is read out. The read out port number is used to perform P2P communication with the partner device (step S81). The calling-side processing is terminated and the processing returns to the main processing (refer to FIG. 5).

If the positive response packet (OK response) has not been received in the processing at step S77 (NO at step S77), it is determined whether the negative response packet (NG response) transmitted from the partner device has been received via the server 11 (step S83). If the negative response packet (NG response) has not been received (NO at step S83), the processing returns to the processing at step S65. If the negative response packet (NG response) has been received (YES at step S83), it means that the partner device has rejected communication path establishment, with respect to the request packet (INVITE) transmitted by the communication device 2 in the processing at step S63. The port opened in the processing at step S61 is closed (step S85). It is therefore possible to inhibit the opened port from being used by an unspecified third party. An ACK packet notifying reception of the negative response packet (NG response) is transmitted to the partner device via the server 11 (step S87). The calling-side processing is terminated and the processing returns to the main processing (refer to FIG. 5).

Figure 8:
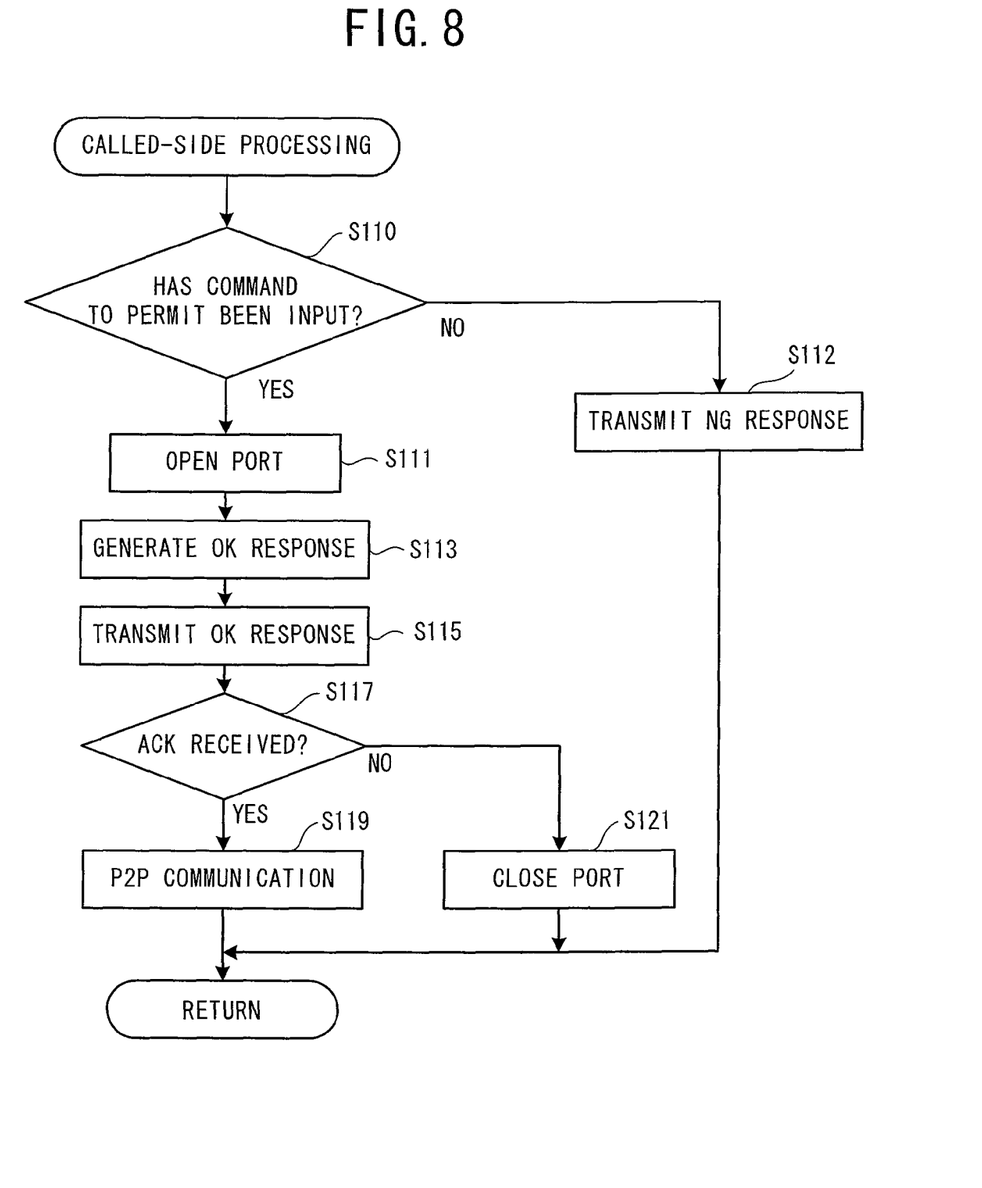
FIG. 8 is a flowchart showing called-side processing.

The called-side processing will be described with reference to FIG. 8. First, it is determined whether a command to permit communication path establishment with the partner device has been input (step S110). If the command to permit communication path establishment has not been input and a command to reject communication path establishment has been input (NO at step S110), a negative response packet (NG response) is transmitted to the partner device via the server 11 (step S112). The called-side processing is terminated and the processing returns to the main processing (refer to FIG. 5). On the other hand, if the command to permit communication path establishment has been input (YES at step S110), a port that is used to perform P2P communication with the partner device is opened (step S111). Next, a positive response packet (OK response) to which the port number of the opened port and the ID of the communication device 2 are added is generated (step S113). The generated positive response packet (OK response) is transmitted to the partner device via the server 11 (step S115). It is determined whether the ACK packet returned from the partner device has been received (step S117). If the ACK packet has been received (YES at step S117), it means that the communication path with the partner device has been established. The port number added to the request packet (INVITE) received in the processing at step S55 (refer to FIG. 5) is read out from the RAM 23. The read out port number is used to perform P2P communication with the partner device (step S119). The called-side processing is terminated and the processing returns to the main processing (refer to FIG. 5). If the ACK packet has not been received (NO at step S117), the port opened in the processing at step S111 is closed (step S121). The called-side processing is terminated and the processing returns to the main processing (refer to FIG. 5).

As described above, after the communication device 2 has transmitted a request packet (INVITE) to the partner device, if the packet received from the partner device is a request packet (INVITE), the communication device 2 may not close the opened port and may continuously use the opened port. Thus, even in a case where the transmission timing of the request packet (INVITE) of the communication device 2 is substantially the same as that of the partner device, it is possible to inhibit opening/closing of the port from occurring frequently. The packets can be forwarded accurately by a relay device located on the communication path between the communication device 2 and the partner device. Therefore, the communication device 2 can perform highly reliable communication with the partner device. The number of ports to be opened can be reduced to a minimum, and it is therefore possible to maintain favorable communication security.

The present invention is not limited to the above-described embodiment, and various modifications may be made. In the above-described embodiment, the ID of the communication device 2 may be added to the request packet (INVITE) generated by the communication device 2. The communication device 2 may compare the ID added to the received request packet (INVITE) with the ID of the communication device 2, and thereby may determine the type of the response packet to be returned. The information added to the request packet (INVITE) is not limited to the ID. For example, a random number generated based on a predetermined randomized algorithm may be added to the request packet (INVITE) as additional information. For example, in the processing at step S62 shown in FIG. 6, a random number may be generated instead of acquiring the ID. The communication device 2 may add the generated random number to the request packet (INVITE) and may transmit the request packet (INVITE) to the partner device (step S63). The communication device 2 may compare the random number added to the received request packet (INVITE) with the random number generated by the communication device 2, and may thereby determine the type of the response packet to be returned. Thus, it is possible to reliably assign the communication device 2 that transmits the positive response packet (OK response) and the communication device 2 that transmits the negative response packet (NG response). As a result, it is possible to stably establish a communication path and to perform P2P communication.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A communication device comprising:
a processor; and
a memory configured to store computer-readable instructions, wherein execution of the computer-readable instructions cause the processor to perform processes comprising:
opening a port that is to be used when peer to peer communication is performed with another communication device;
transmitting, to the other communication device, a first request packet to which a port number of the port and additional information of the communication device are added, the first request packet being a packet requesting establishment of a communication path with the other communication device;
determining, in a case where a response packet in response to the first request packet that has been transmitted is not received from the other communication device and a second request packet is received from the other communication device, whether to transmit a positive response packet to the other communication device, based on additional information added to the second request packet, the second request packet being a packet requesting establishment of a communication path with the communication device;
transmitting the positive response packet to the other communication device in a case where it is determined that the positive response packet is to be transmitted; and
closing the port in a case where, after the positive response packet has been transmitted, a positive response packet is received from the other communication device.

2. The communication device according to claim 1, wherein
the computer-readable instructions further cause the processor to perform a process comprising:
performing peer to peer communication with the other communication device using the port number of the port that has been opened in a case where a negative response packet is received from the other communication device after the positive response packet has been transmitted.

3. The communication device according to claim 1, wherein
the computer-readable instructions further cause the processor to perform a process comprising:
transmitting a negative response packet to the other communication device in a case where it is determined that the positive response packet is not to be transmitted.

4. The communication device according to claim 3, wherein
the computer-readable instructions further cause the processor to perform a process comprising:
performing peer to peer communication with the other communication device using the port number of the port in a case where a positive response packet is received from the other communication device after the negative response packet has been transmitted.

5. The communication device according to claim 3, wherein
the computer-readable instructions further cause the processor to perform a process comprising:
closing the port in a case where, after the negative response packet has been transmitted, a negative response packet is received from the other communication device.

6. The communication device according to claim 1, wherein
the computer-readable instructions further cause the processor to perform a process comprising:
generating a random number,
the random number that has been generated is added as the additional information to the first request packet, and
the first request packet is transmitted to the other communication device.

7. The communication device according to claim 1, wherein
the computer-readable instructions further cause the processor to perform a process comprising:
transmitting a negative response packet to the other communication device in a case where the additional information is not added to the second request packet.

8. A non-transitory computer-readable medium storing computer readable instructions that, when executed, cause a communication device to:
open a port that is to be used when peer to peer communication is performed with another communication device;
transmit, to the other communication device, a first request packet to which a port number of the port and additional information of the communication device are added, the first request packet being a packet requesting establishment of a communication path with the other communication device;
determine, in a case where a response packet in response to the first request packet that has been transmitted is not received from the other communication device and a second request packet is received from the other communication device, whether to transmit a positive response packet to the other communication device, based on additional information added to the second request packet, the second request packet being a packet requesting establishment of a communication path with the communication device;
transmit the positive response packet to the other communication device in a case where it is determined that the positive response packet is to be transmitted; and close the port in a case where, after the positive response packet has been transmitted, a positive response packet is received from the other communication device.

9. The non-transitory computer-readable medium according to claim 8, wherein
the computer readable instructions further cause the communication device to perform peer to peer communication with the other communication device using the port number of the port that has been opened in a case where a negative response packet is received from the other communication device after the positive response packet has been transmitted.

10. The non-transitory computer-readable medium according to claim 8, wherein
the computer readable instructions further cause the communication device to transmit a negative response packet to the other communication device in a case where it is determined that the positive response packet is not to be transmitted.

11. The non-transitory computer-readable medium according to claim 10, wherein
the computer readable instructions further cause the communication device to perform peer to peer communication with the other communication device using the port number of the port in a case where a positive response packet is received from the other communication device after the negative response packet has been transmitted.

12. The non-transitory computer-readable medium according to claim 10, wherein
the computer readable instructions further cause the communication device to close the port in a case where, after the negative response packet has been transmitted, a negative response packet is received from the other communication device.

13. The non-transitory computer-readable medium according to claim 8, wherein
the computer readable instructions further cause the communication device to generate a random number, the random number that has been generated is added as the additional information to the first request packet, and
the first request packet is transmitted to the other communication device.

14. The non-transitory computer-readable medium according to claim 8, wherein
the computer readable instructions further cause the communication device to transmit a negative response packet to the other communication device in a case where the additional information is not added to the second request packet.

15. A method of controlling a communication device, the method comprising the steps of:
opening a port that is to be used when peer to peer communication is performed with another communication device;
transmitting, to the other communication device, a first request packet to which a port number of the port and additional information of the communication device are added, the first request packet being a packet requesting establishment of a communication path with the other communication device;
determining, in a case where a response packet in response to the first request packet that has been transmitted is not received from the other communication device and a second request packet is received from the other communication device, whether to transmit a positive response packet to the other communication device, based on additional information added to the second request packet, the second request packet being a packet requesting establishment of a communication path with the communication device;
transmitting the positive response packet to the other communication device in a case where it is determined that the positive response packet is to be transmitted; and
closing the port in a case where, after the positive response packet has been transmitted, a positive response packet is received from the other communication device.

* * * * *